(12) United States Patent
Srinivasan et al.

(10) Patent No.: US 10,313,224 B2
(45) Date of Patent: Jun. 4, 2019

(54) SEAMLESS HOST MOBILITY

(71) Applicant: Cisco Technology, Inc., San Jose, CA (US)

(72) Inventors: Sathish Srinivasan, Fremont, CA (US); Vrishabha Sikand, Lexington, MA (US); Shyam N. Kapadia, San Jose, CA (US); Lukas Krattiger, Pleasanton, CA (US); Massimiliano Ardica, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/263,556

(22) Filed: Sep. 13, 2016

(65) Prior Publication Data

US 2018/0077047 A1    Mar. 15, 2018

(51) Int. Cl.
*H04L 12/46* (2006.01)
*H04L 29/12* (2006.01)
*H04L 12/721* (2013.01)
*H04L 12/751* (2013.01)

(52) U.S. Cl.
CPC .......... *H04L 45/02* (2013.01); *H04L 12/4641* (2013.01); *H04L 45/66* (2013.01); *H04L 61/103* (2013.01)

(58) Field of Classification Search
CPC ... H04L 12/4641; H04L 45/02; H04L 61/103; H04L 61/2007
See application file for complete search history.

(56) References Cited

U.S. PATENT DOCUMENTS

| | | | |
|---|---|---|---|
| 8,953,624 B2 | 2/2015 | Yang et al. | |
| 9,628,380 B2* | 4/2017 | Xia | ........................ H04L 45/58 |
| 2013/0254359 A1* | 9/2013 | Boutros | ................ H04L 61/103 709/223 |
| 2013/0308646 A1 | 11/2013 | Sajassi et al. | |
| 2015/0016461 A1 | 1/2015 | Qiang | |
| 2016/0134526 A1 | 5/2016 | Maino et al. | |
| 2017/0373973 A1* | 12/2017 | Bickhart | ............. H04L 12/4641 |

* cited by examiner

*Primary Examiner* — Timothy J Weidner
*Assistant Examiner* — Debebe A Asefa
(74) *Attorney, Agent, or Firm* — Edell Shapiro & Finnan, LLC

(57) ABSTRACT

Presented herein are techniques to enable seamless mobility of hosts (endpoints) between disaggregated Ethernet virtual private network (EVPN) domains that are connected with one another by an external network (e.g., a Wide-Area Network (WAN)). In one example, a leaf node in the first domain, which was previously connected to a host, receives updated routing information for the host. The leaf node performs a local host verification process to confirm that the host has moved and, in response to confirming that that the host has moved, the first leaf node sends a targeted host announcement message to the host in the second domain.

20 Claims, 9 Drawing Sheets

SEAMLESS HOST MOBILITY

TECHNICAL FIELD

The present disclosure relates to seamless host mobility across disaggregated Ethernet virtual private network (EVPN) domains.

BACKGROUND

A host device, also referred herein to as host or endpoint, is a physical or virtual entity connected to a computer network. A host device may offer, for example, informational resources, services, applications, etc. to users or other nodes connected to the network. In general, a host device is assigned one or more unique network addresses, such as a Media Access Control (MAC) address and/or an Internet Protocol (IP) address.

The use of virtualization, including the use of virtual host devices (virtual endpoints), has become increasingly popular with network administrators. In general, virtual host devices have the ability to migrate/move over time such that memory, storage, processing, network connectivity, etc. of the virtual host device are all transferred from one physical server to another physical server.

DESCRIPTION OF EXAMPLE EMBODIMENTS

Overview

Figure 1:
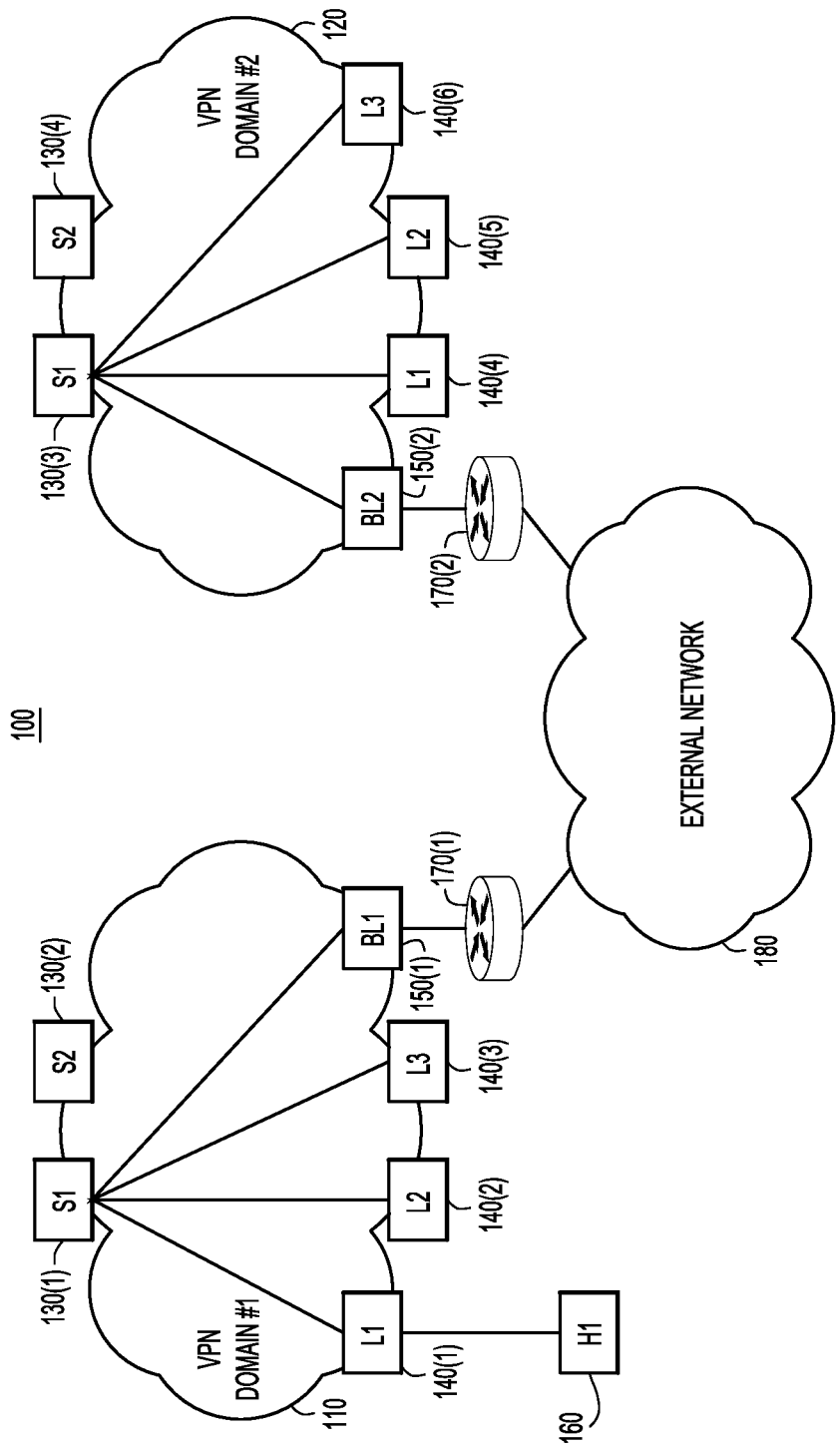
FIG. 1 is a block diagram of a network environment configured to implement seamless host device mobility techniques, according to an example embodiment.

Presented herein are techniques to enable seamless mobility of host devices (endpoints) between disaggregated Ethernet virtual private network (EVPN) domains that are connected with one another by an external network (e.g., a Wide-Area Network (WAN)). In one example, a leaf node in the first domain, which was previously connected to a host device, receives updated routing information for the host device. The leaf node performs a local host verification process to confirm that the host device has moved and, in response to confirming that that the host device has moved, the first leaf node sends a targeted host announcement message (e.g., a targeted address resolution protocol (ARP) message, a targeted neighbor discovery protocol (NDP) message, etc.) to the host device in the second domain.

In another example, a first border leaf node in the first domain receives an indication that a host device has moved from the first domain to the second domain. In response to receiving this indication that the host device has moved from the first domain to the second domain, the first border leaf node encodes a sequence number associated with the host device into a control packet, such as a BGP update message, that is routed by a routing protocol supported by the external network. The first border leaf node sends, via the external network, the control packet with the encoded sequence number to a second border leaf node in the second domain over so that the second border network device can extract the encoded sequence number from the control packet.

Example Embodiments

The proliferation of high-bandwidth communication and virtual technologies virtual has enabled enterprises to create Ethernet virtual private network (EVPN) domains that are connected with one another via an external network (e.g., WAN) that may not support EVPN technology. EVPN domains that are connected with one another via an external network that does not support EVPN technology are referred to herein as "disaggregated" EVPN domains. While current technologies efficiently handle movement/migration of host devices (endpoints) within a single EVPN domain (i.e., moving from one node to another within the same domain), significant logistical challenges exist when a host device moves between disaggregated EVPN domains (i.e., inter-domain movement across an external network).

The logistical challenges associated with inter-domain movement are due, at least in part, to the inability of the external network to exchange all of the attributes of stored routing information associated with a host device. For example, in an example deployment, a VPN fabric, such as EVPN address-family based fabric, is localized to only a specific domain (local network site) and a sequence number associated with the host device (i.e., associated with routing information of the host device) are terminated at the border of the EVPN domain. That is, the sequence number associated with the host and the MAC-IP binding, are not carried between the different domains by the external network. The inability to share the attributes of stored routing information when a host device moves between two disaggregated EVPN domains leads to inconsistent and stale routing information across the EVPN.

To enable seamless movement of host devices between disaggregated EVPN domains, therefore, the Layer 2 and Layer 3 networks of the domains have to be extended across the external network linking together the disaggregated EVPN domains. As such, presented herein are techniques in which a host device migrates between first and second disaggregated EVPNs, while ensuring that network devices in both domains have accurate and consistent routing information associated with the host device.

FIG. 1 illustrates an example network environment 100 in which seamless host device mobility techniques in accordance with examples presented herein are implemented. Network environment 100 includes first and second disaggregated EVPN domains 110 and 120, which are in communication (i.e., connected) with one another via an external network 180. In a specific example, first domain 110 and second domain 120 may be Virtual Extensible LAN (VX-LAN) Ethernet VPNs ("EVPNs") that deploy various fabric technologies (e.g., Internet Protocol-Border Gateway Protocol ("IP-BGP"), Border Gateway Protocol ("BGP") Ethernet Virtual Private Network ("EVPN"), FabricPath using BGP Layer 3 Virtual Private Network ("L3EVPN"), Multi-Protocol Label Switching ("MPLS") fabric, etc.) for traffic routing. VXLAN is an overlay technology for network virtualization that provides Layer 2 extension over a Layer 3 underlay infrastructure network by using MAC addresses in Internet Protocol/User Datagram Protocol (IP/UDP) tunneling encapsulation. According to a further example, external network 180 may be a Layer 2/3 Data Center Interconnect ("DCI") network.

The first EVPN domain 110 comprises one or more network devices (e.g., wireless access points, gateways, routers, switches, etc.), such as network devices 130(1) and 130(2). Network devices 130(1)-130(2) are typically referred to as spine nodes or spine devices. The spine nodes 130(1) and 130(2) are in communication with one or more leaf nodes, such as leaf nodes 140(1), 140(2) and 140(3), as well as a border leaf node 150(1), which is sometimes referred to herein as a border network device. As shown, a host device (endpoint) 160 is connected to leaf node 140(1). Host device 160 may be any physical or virtual device that is configured to generate and transmit data/packet flows across domain 110 via leaf node 140(1).

Similarly, the second EVPN domain 120 comprises one or more network devices, such as spine nodes 130(3) and 130(4). The spine nodes 130(3) and 130(4) are in communication with one or more leaf nodes, such as leaf nodes 140(4), 140(5), and 140(6), as well as a border leaf node 150(2), which is sometimes referred to herein as a border network device. Data within each of the first domain 110 and the second domain 120 is forwarded using regular Layer 2 and Layer 3 semantics for bridged and routed traffic respectively. According to an example, data traffic between the first domain 110 and the second domain 120 may be bridged by a Layer 2 device (e.g., switch, bridge, etc.) or routed via a Layer 3 device (e.g., router, etc.).

External network 180 may include, for example, one or more wide area networks (WANs), such as one or more DCI networks. In one example arrangement, one or more routing devices, such as routers 170(1) and 170(2), are configured to route one or more network traffic flows received from the border network devices 150(1) and 150(2), respectively, over network 180 (i.e., the EVPN domains 110 and 120 are connected to the external network 180 via routers 170(1) and 170(2), respectively). The spine nodes 130(1) and 130(2) in the first domain 110 are configured to route or switch data packets between leaf nodes 140(1), 140(2) and 140(3), and/or border leaf node 150(1).

In one example, traffic from host device 160 is forwarded first to leaf node 140(1), where it is encapsulated and sent over to the leaf node below which the destination host device is attached. The network devices 130(1) and/or 130(2) route network traffic to the destination leaf node where the traffic is decapsulated and then appropriately forwarded toward the destination host device. The destination leaf nodes may be 140(2) or 140(3), or the border leaf node 150(1) in the case of outbound traffic (i.e. traffic leaving the domain). One or more network traffic flows originating from the host device 160 may be, for example, an IP packet flow. When an outbound network traffic flow generated from the host device 160 is received at the border leaf node 150(1), the border leaf node is configured to use stored routing information associated with the destination host device to forward the network traffic flow to the border leaf node 150(2) in domain 120 (e.g., via routing devices 170(1) and 170(2) and external network 180).

The routing information associated with the host device 160, which is used by the network devices in the first domain 110 to forward network traffic flows, may include a number of different attributes, such as Layer 2 and/or Layer 3 address information for the host device 160, forwarding routing information (i.e., route location) associated with the host device, a sequence number associated with the host device, etc. As used herein, a "sequence number" is an attribute that identifies the most updated (i.e., up-to-date) routing information for a host device within a given domain. In operation, a sequence number is a host move attribute that is incremented/increased each time a host device changes locations. In other words, the sequence number is a type of counter for the current location of a host device, such as host device 160. For example, at the first instance when a host device is connected to a fabric under a leaf node, the sequence number for the host device is set to zero. If the host device moves under a new leaf node, then this new leaf node increments the sequence number associated with the host device and advertises this new sequence number. This process continues as the host device continues to move within the same domain.

Figure 2:
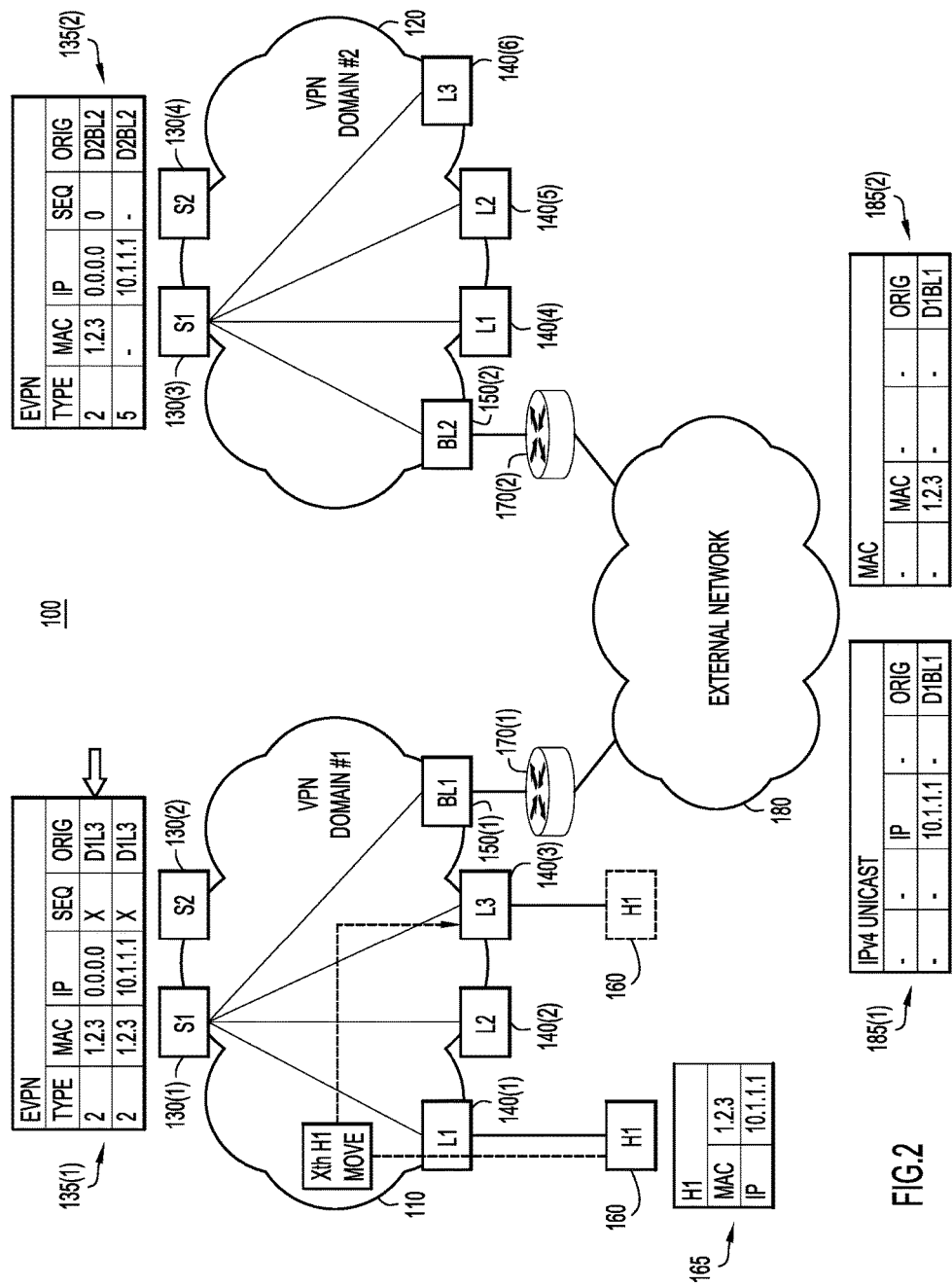
FIG. 2 is a diagram illustrating movement of a host device within a first Ethernet virtual private network (EVPN) domain, according to an example embodiment.

For example, FIG. 2 is a diagram illustrating movement of the host device 160 within the first domain 110 of FIG. 1 (i.e., inner-domain movement). As shown in FIG. 2, host device 160 is initially connected to leaf node 140(1) and has address information 165 associated therewith. The address information 165 includes a Media Access Control ("MAC") address and an Internet Protocol ("IP") address for the host device 160. In the specific example of FIG. 2, host device 160 has an associated MAC address of 1.2.3 and an associated IP address of 10.1.1.1.

When the host device 160 initially connects to the domain 110, the data plane fabric is "flooded" with an MAC update advertisement notifying networking devices in the domain 110 (e.g., 130(1)-130(2), 140(1)-140(3) and 150(1)) of the MAC address and current location of host device 160. This broadcast advertisement enables the leaf nodes in the first domain 110 to learn the location of host device 160 or to create or update their routing information tables accordingly. An example routing information table 135(1) for leaf node 140(1) is show in FIG. 2.

As shown in FIG. 2, the routing information table 135(1) may initially have two records associated with host device 160, namely a Layer 2 route identifying the MAC address of host device 160 (e.g., 1.2.3), and a Layer 3 route including both the MAC address and Internet Protocol ("IP") address (e.g., 10.1.1.1). Both the first record and the second record in the routing information table 135(1) may further include a column identifying the leaf node to which host device 160 is connected. When leaf node 140(1) receives the initial advertisement from host device 160, the leaf node 140(1) sets the sequence number associated with each route in routing information table 135(1) to an initial value (e.g., 0). According to one specific example, the Layer 2 route associated with host device 160 in routing information table 135(1) may be a type 2 EVPN route identifying the MAC address of host device 160 and having no entry, e.g., 0.0.0.0, for the IP address, and the Layer 3 route in table 135(1) associated with host device 160 may be a type 2 EVPN route binding together the MAC address and IP address associated with host device 160.

Because the MAC update advertisement is flooded in the Layer 2 data plane, the border leaf node 150(2) in the second domain 120 receives the MAC update advertisement via a Layer 2 port of the external network 180. Accordingly, the border leaf node 150(2) in the second domain 120 may update its routing information table 135(2) to include a Layer 2 route identifying the MAC address associated with the host device 160 and its current forwarding location as the border network device 150(2). According to one such example, the Layer 2 route associated with the host device is a type 2 EVPN route having an initialized sequence number of 0. The routing information table 135(2) may also include a Layer 3 route including the IP address associated with host device 160. However, because the Layer 3 interface at external network 180 does not forward the MAC/IP binding associated with the host device 160, the Layer 3 route does not include the Layer 2 MAC address of the host device 160 and does not have an associated sequence number. Therefore, according to a specific example, the Layer 3 routing information is a type 5 EVPN route identifying the border network device for the second domain as the forwarding location for the host device 160.

In other words, a leaf in the second domain 120 may, in response to receiving a broadcast advertisement from the host device 160 (via external network 180), create a Layer 2 route that includes the MAC address associated with host 160 and assigns an initial sequence number to the Layer 2 route (e.g., 0). However, because the IP/MAC binding is split at external network 180, the networking device in the second domain 120 is unable to create a Layer 3 route binding together the MAC and IP addresses associated with host device 160.

The networking devices in the external network 180, such as routers 170(1) and 170(2), may also create records for host device 160 in their corresponding routing tables 185(1) and 185(2). Referring to table 185(2), a Layer 3 record includes the IP address of the host device 160 and identifies the border network device 150(1) as the Layer 3 forwarding location for the host device 160. Using the Layer 3 route in routing table 185(2), the external network 180 is able to successfully route Layer 3 data packets directed to the host device 160. Referring to table 185(1), a Layer 2 route associated with host device 160 includes the MAC address of host device 160 and identifies the border network device 150(1) as the Layer 2 bridging location for the host device 160. Using the Layer 2 route in the routing table 185(1), the external network 180 is able to successfully bridge Layer 2 data packets directed to the host device 160.

FIG. 2 schematically illustrates that, at some point in time, the host device 160 migrates/moves within the first domain 110 from the leaf node 140(1) to the leaf node 140(3). That is, the host device 160 changes its location such that it is now connected to leaf node 140(3), rather than leaf node 140(1). When the host device 160 moves, the host device sends a broadcast announcement to each of the other nodes within the first domain 110. In response to receiving this broadcast announcement, leaf node 140(1) may update the Layer 2 route associated with the host device 160 in the routing information table 135(1) to change the forwarding location to leaf node 140(3). The leaf node 140(3) also increases the sequence number of the Layer 2 route, and advertises the updated Layer 2 route to each of the other node devices within the first domain 110. Additionally, leaf node 140(3) may update the Layer 3 route associated with the host device 160 in the routing information table 135(1), binding the MAC address and IP address of host device 160 and to identify the leaf node 140(3) as the Layer 3 forwarding location for the host device 160. As with the Layer 2 route, leaf node 140(3) increases the sequence number included in the updated Layer 3 route.

It should be understood that the host device 160 may move multiple times within domain 110, and, upon each move, the sequence numbers associated with the host device 160 (i.e., associated with the Layer 2 and/or Layer 3 routes associated with the host device 160 in the routing information table 135(1)) are also updated in a similar manner as described above.

With respect to the routing information table 135(2) for the second domain 120, the Layer 2 route associated with the host device 160 is not updated when the host device 160 moves within domain 110. No change is needed in domain 120 because the forwarding location of the host device 160, with respect to the node devices in the second domain 120, remains unchanged (i.e., remains border network device 150(2)). For a similar rationale, the Layer 3 route associated with the host device 160 in the routing information table 135(2) also remains unchanged. Additionally, the Layer 2 routing information in table 185(2) and the Layer 3 routing information in table 185(1) in the external network 180 also remain unchanged, continuing to identify the border network device 150(1) as the forwarding location for the host device 160.

As noted, current technologies efficiently handle movement/migration of host device 160 within domain 110. However, in certain circumstances, host device 160 may move from domain 110 to domain 120. Such inter-domain movement is problematic for current technologies and presents significant logistical challenges.

EXAMPLE 1

Figure 3:
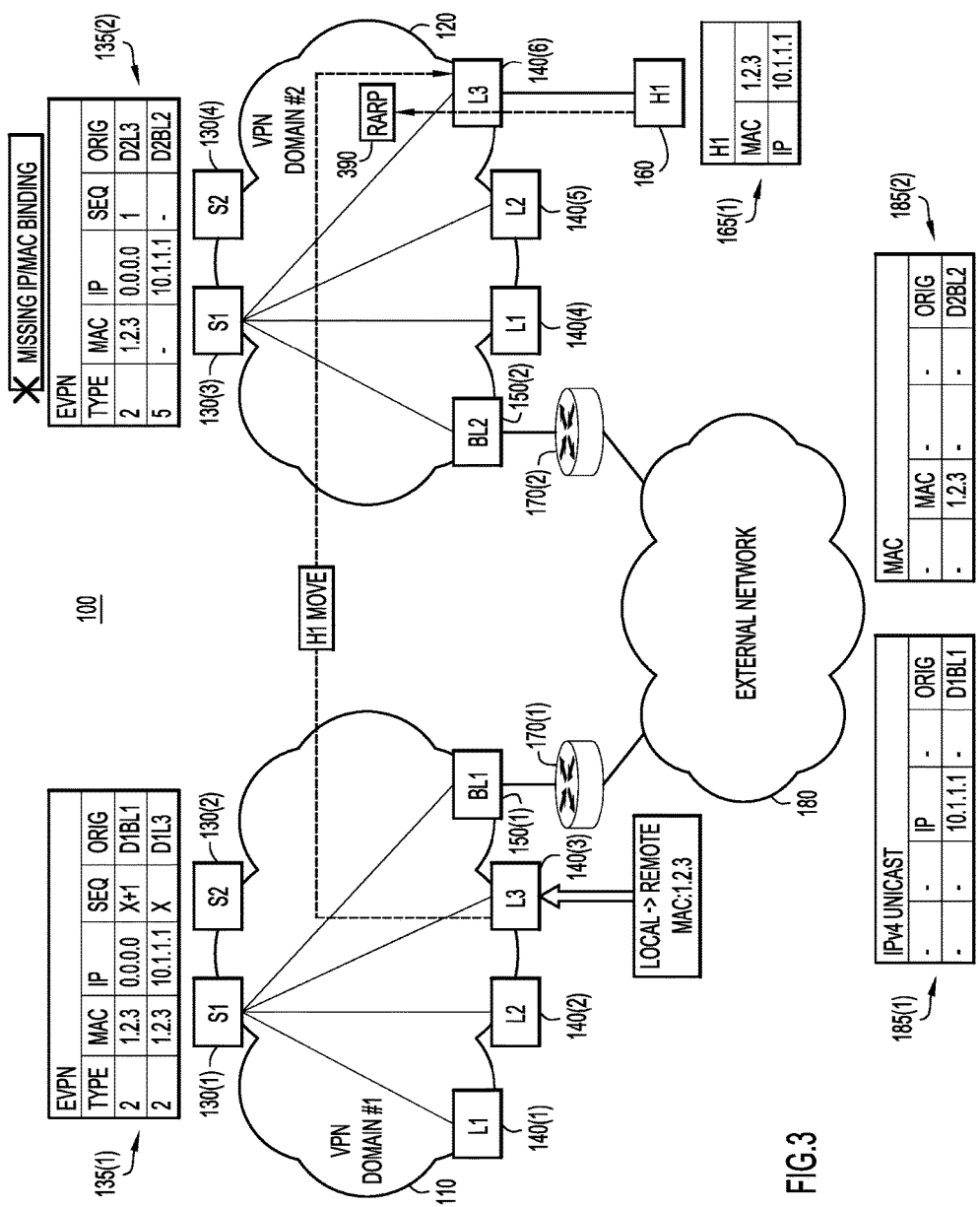
FIG. 3 is a diagram illustrating movement of a host device between disaggregated domains of an EVPN and the broadcasting of a reverse address resolution protocol ("RARP") message, according to an example embodiment.
Figure 4:
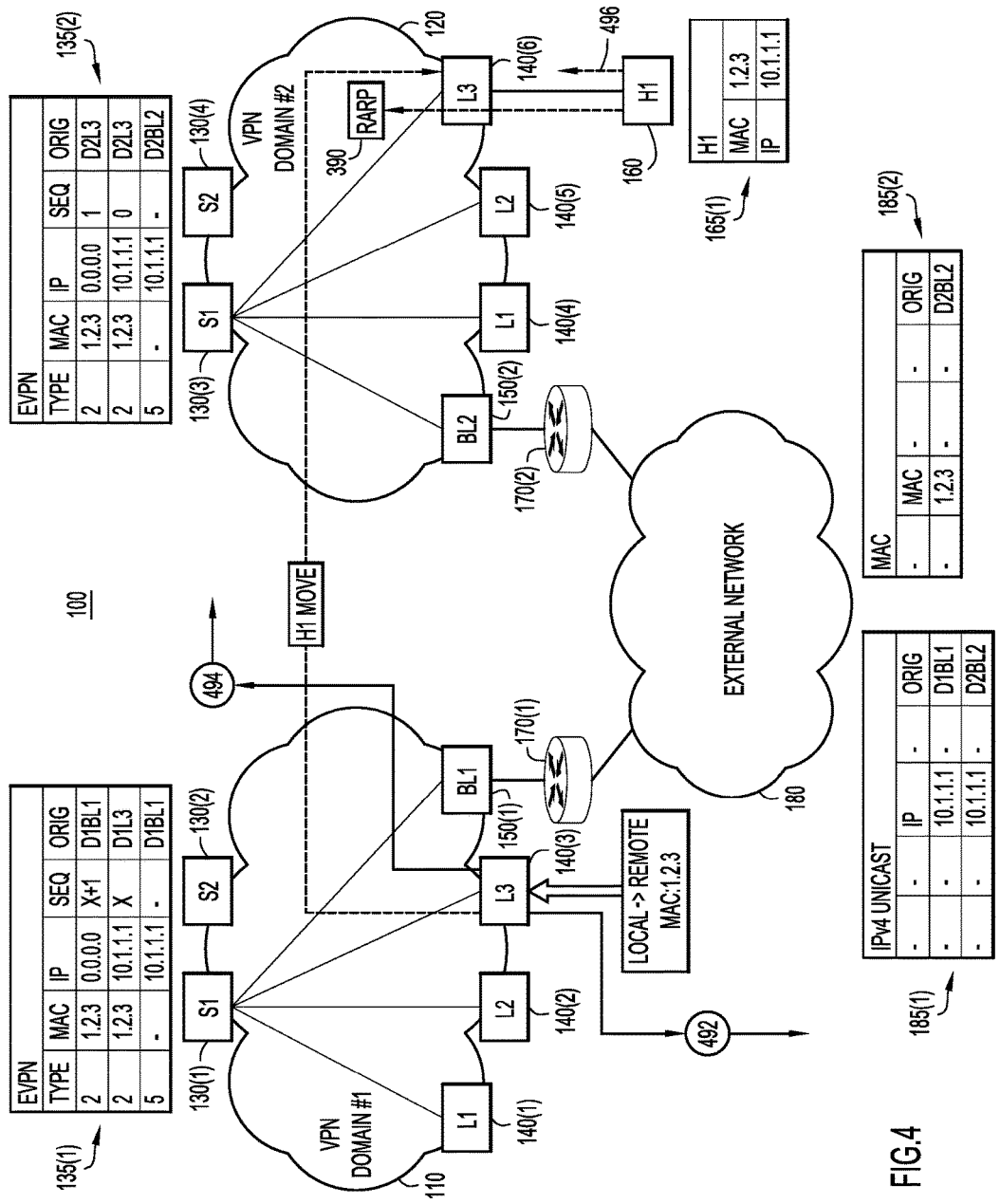
FIG. 4 is a diagram illustrating a method for seamlessly updating routing information across disaggregated EVPN domains in response to a RARP message, according to an example embodiment.

When host device 160 moves from first domain 110 to second domain 120 of the disaggregated EVPN, the host device 160 is configured to broadcast a host device move notification, such as a reverse address resolution protocol ("RARP") message, a gratuitous address resolution protocol ("GARP") message, etc. FIG. 3 illustrates the broadcast of an RARP message in connection with network environment 100 when host device 160 moves from domain 110 to domain 120. FIG. 4 illustrates subsequent operations performed following the RARP message to delete stale Layer 3 entries in the routing information tables (e.g. 135(1)) in domain 110 and to cause the nodes in the second domain 120 to update the Layer 3 routes in their routing information tables (eg., 135(2)) to bind together the MAC address and IP address of the host device 160.

Referring first to FIG. 3, when host device 160 moves from the first domain 110 to the second domain 120, the host device broadcasts a RARP message 390, advertising its MAC address to each of the other node devices in the second domain 120. In response to receiving the broadcast RARP message 390, border leaf node 150(2) may update the Layer 2 route associated with host device 160 in its routing information table 135(2) to include the new forwarding location for the host device 160 (e.g., leaf node 140(6)).

Additionally, leaf node 140(6) increases the sequence number associated with host device 160 to indicate that the updated Layer 2 route should take precedence over the previous Layer 2 routes associated with the host device 160. For example, the leaf node 140(6) may increase the sequence number of the Layer 2 route associated with the host device 160 from 0 to 1, indicating that the prior Layer 2 route associated with the host device 160, having a sequence number of 0 and pointing to the remote leaf node 140(1), is superseded by the updated Layer 2 route associated with the host device 160 having a sequence number of 1 and pointing to the local leaf node 140(6). The leaf node 140(6) may then broadcast the updated Layer 2 route associated with the host device 160 to each of the other node devices in the second domain 120.

The RARP message 390 is flooded on the Layer 2 data plane of the network environment 100 and, as a result, the border leaf node 150(1) receives the broadcast RARP message 390 on a Layer 2 port of the external network 180. In response, the border leaf node 150(1) also updates the Layer 2 route associated with the host device 160 in its routing information table, including identifying itself as the forwarding location for the host device 160 and increasing the associated sequence number (i.e., 150(1) discovers change of MAC from interior node 140(1) to itself). Border leaf node 150(1) may then advertise the updated Layer 2 route each of the other nodes in the first domain 110, including leaf node 140(1), which may, in turn, update the Layer 2 route associated with the host device 160 in the routing information table 135(1).

For example, as shown in FIG. 3, the Layer 2 route associated with the host device 160 in the routing information table 135(1) includes an associated sequence number of X and identifies the forwarding location for the host device 160 as the leaf node 140(3). Upon receiving the RARP message 390, the border leaf node 150(1) updates the Layer 2 route associated with the host device 160 to have an increased sequence number of X+1 and a forwarding location for the host device 160 as the border network device 150(1). According to an example, the Layer 2 route associated with the host device 160 is a type 2 EVPN route. Because Layer 2 routes having higher sequence numbers take priority over those having lower sequence numbers, proper Layer 2 forwarding of data packets to the host device 160 between disaggregated domains of the networking environment 100 is ensured.

The broadcast RARP message 390 does not include Layer 3 address information associated with the host device 160. As a result, the leaf nodes in the second domain 120 are unable to create a Layer 3 route binding together the MAC address and the IP address associated with the host device 160. Consequently, the routing information table 135(2) continues to incorrectly identify the Layer 3 forwarding location associated the host device 160 as the border leaf node 150(2). Furthermore, because the border leaf node 150(1) receives the broadcast RARP message 390 on a Layer 2 port of external network 180, it does not create or advertise a Layer 3 route associated with the host device 160. Therefore, the leaf node 140(1) does not update the routing information table 135(1) to include an updated Layer 3 route for the host device 160.

Referring next to FIG. 4, before host device 160 moved from domain 110 to domain 120, the host device 160 was connected to leaf node 140(3). Therefore, in response to receiving the updated Layer 2 route indicating that host device 160 has moved (i.e., upon sensing a MAC move), the leaf node 140(3) queries its database and finds a matching IP address. As a result, the leaf node 140(3) performs a local host verification process, which means that the leaf node 140(3) sends an address resolution protocol (ARP) refresh 492, sometimes referred to herein as a host verification message, to a local port to which host device 160 was attached with a short timeout to verify whether the host device 160 as moved. If the leaf node 140(3) does not receive an ARP response within the timeout period, then the leaf node 140(3) removes the local IP/MAC binding from its routing table.

If the leaf node 140(3) determines that the host device 160 has moved (i.e., does not receive the ARP response), then leaf node 140(3) sends a targeted/directed host announcement message 494 (e.g., a targeted address resolution protocol (ARP) message, a targeted neighbor discovery protocol (NDP) message, etc.) to the host device in the second domain. For ease of illustration, FIG. 4 is described with reference to a targeted host announcement message in the form of a targeted ARP message 494 that is sent to the host device 160. This targeted ARP message 494 is a unicast ARP message with a destination media access control (DMAC) address of the host device 160 and a source MAC address corresponding to the ANYCAST gateway MAC address for the leaf nodes 140(1)-140(6). That is, the ANYCAST gateway MAC address is a MAC address that is the same on every leaf node in the EVPN.

As MAC route has already been fixed due to the RARP message 390 broadcast, the targeted ARP message 494 arrives at host device 160. When the host device 160 responds to the targeted ARP message 494, the host device sends an ARP response 496 to the ANYCAST GATEWAY MAC address as the destination MAC address. The ARP response 496 is trapped by leaf node 140(6) as it also has a gateway MAC address as the ANYCAST gateway MAC address. This results in leaf node 140(6) obtaining the IP and MAC binding for host device 160. As such, the leaf node 140(6) can now originate a MAC route as well as an IP and MAC route with the right sequence number In summary, FIGS. 3 and 4 illustrate examples enabling seamless host device mobility where the leaf node previously connected to the host device 160 in the first domain 110 prior to the inter-domain move (e.g., leaf node 140(3)), sends a first host verification message to the port to which the host device was previously connected to verify that the host device 160 has moved. If the leaf node 140(3) determines that the host device 160 has moved, it deletes the stale Layer 3 route associated with the host device 160 in its routing information table and sends a targeted ARP message to the host device 160 in the second domain 120. In response to receiving the targeted ARP message, the host device 160 sends a unicast ARP response that is trapped by the leaf node to which the host device 160 is now connected.

The above examples of FIGS. 3 and 4 have been described with reference to a RARP-based move (i.e., the host device 160 issues a RARP message upon moving from domain 110 to domain 120). However, it is to be appreciated examples presented herein may also operate with GARP-based moves (i.e., when the host device 160 issues a GARP message upon moving from domain 110 to domain 120). In such GARP-based moves, the operations performed may be similar to those described with reference to FIGS. 3 and 4.

EXAMPLE 2

As noted above, the interface of the external network 180 does not carry all of the attributes of a Layer 3 route between domains. As such, the Layer 3 route associated with the host device 160 in the routing information tables of the first domain 110 may not include the same sequence number as does the Layer 3 route in the routing information tables of the second domain 120. Consequently, it is possible that duplicate host devices within the network environment 100 may have the same IP addresses associated there with in different routing information tables. To prevent this, FIGS.

5A and 5B, illustrate further techniques in accordance with examples presented herein where the sequence number included in a Layer 3 route associated with a given IP address is carried from a first domain 110 to a second domain 120 across the Layer 3 fabric of the external network 180 (i.e., techniques for exchanging a sequence number between the border leaf node 150(1) in the first domain 110 and the border leaf node 150(2) in the second domain 120).

Figure 5A:
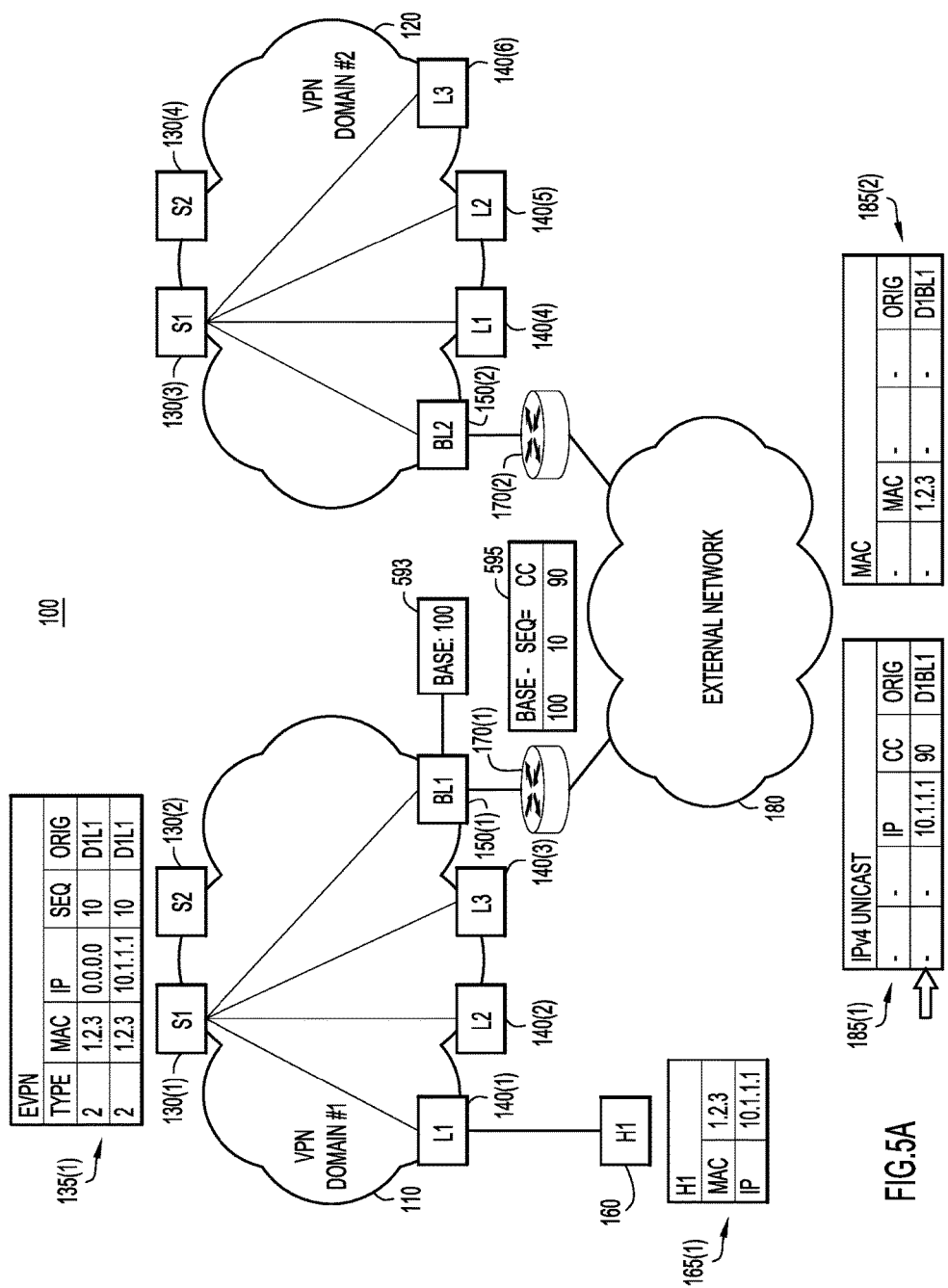
FIGS. 5A and 5B are diagrams illustrating the exchange of a sequence number associated with a host device upon movement across disaggregated EVPN domains, according to an example embodiment.

As shown in FIG. 5A, the leaf node 140(1) has a Layer 2 route associated with host device 160 and a Layer 3 route binding together the MAC address and IP address associated with host device 160 in the routing information table 135(1). According to an example, the Layer 2 route associated with host device 160 and the Layer 3 route may be type 2 EVPN routes having a sequence number (e.g., 10).

To prevent duplicate hosts having the same IP address across the disaggregated EVPN domains 110 and 120, in response to the host device 160 moving from the first domain 110 to the second domain 120, the border leaf node 150(1) may be configured to propagate the first domain sequence number (i.e., the sequence number associated with host device 160 when the host device is in domain 110), across the external network 180. In particular, the border leaf node 150(1) is configured to encode the sequence number into an attribute associated with the Layer 3 routing fabric used by the external network 180 to route Layer 3 data traffic. According to one example, the sequence number is a 4-byte value and may be encoded into a cost community attribute associated with the IP Border Gateway Protocol ("IP-BGP").

For example, in response to receiving a host device move notification sent by host device 160 when moving from domain 110 to domain 120, the border leaf node 150(1) generates and sends a Layer 3 route to the external network 180 for routing to border leaf node 150(2) over a Layer 3 fabric in the external network 180. According to an example, the external network 180 is a DCI supporting the IP-BGP protocol. Because the external network 180 terminates the MAC-IP binding associated with a Layer 3 route, the sequence number associated with the Layer 3 route may not be directly carried across the external network 180. The border leaf node 150(1), therefore, converts the sequence number included in the Layer 3 route associated with host device 160 into a cost community attribute 595, which is supported by the IP-BGP protocol and may therefore by carried across the Layer 3 routing fabric of the external network 180. For example, as shown in FIG. 5A, the border leaf node 150(1) may determine the cost community attribute 595 by subtracting the sequence number from a base number 593 (e.g., 100−10=90). According to an example, the base number 593 is a maximum value permitted for the cost community attribute 595.

After determining the cost community attribute 595, the border leaf node 150(1) includes the cost community attribute 595 in a Layer 3 control packet that it is carried over a Layer 3 fabric. At the Layer 3 interface with the border leaf node 150(2), sequence number is extracted from the cost community attribute 595. For example, as further shown in FIG. 5B, the border leaf node 150(2) may determine the sequence number of the Layer 3 route by subtracting the cost community attribute 595 from the base number 593 (e.g., 100−90=10). After decoding the sequence number, border leaf node 150(2) creates a Layer 3 route associated with host device 160, including the decoded sequence number, and advertises the Layer 3 in the second domain 120. According to an example, the layer 3 route associated with host 160 is a type 5 EVPN route. As a result, the Layer 3 route associated with the host device 160 in the routing information table 135(2) for the second domain 120 has the same sequence number (e.g., 10) as does the Layer 3 route associated with the host device 160 in the routing information table 135(1) for the first domain 110, thereby converging both Layer 3 routes.

Figure 5B:
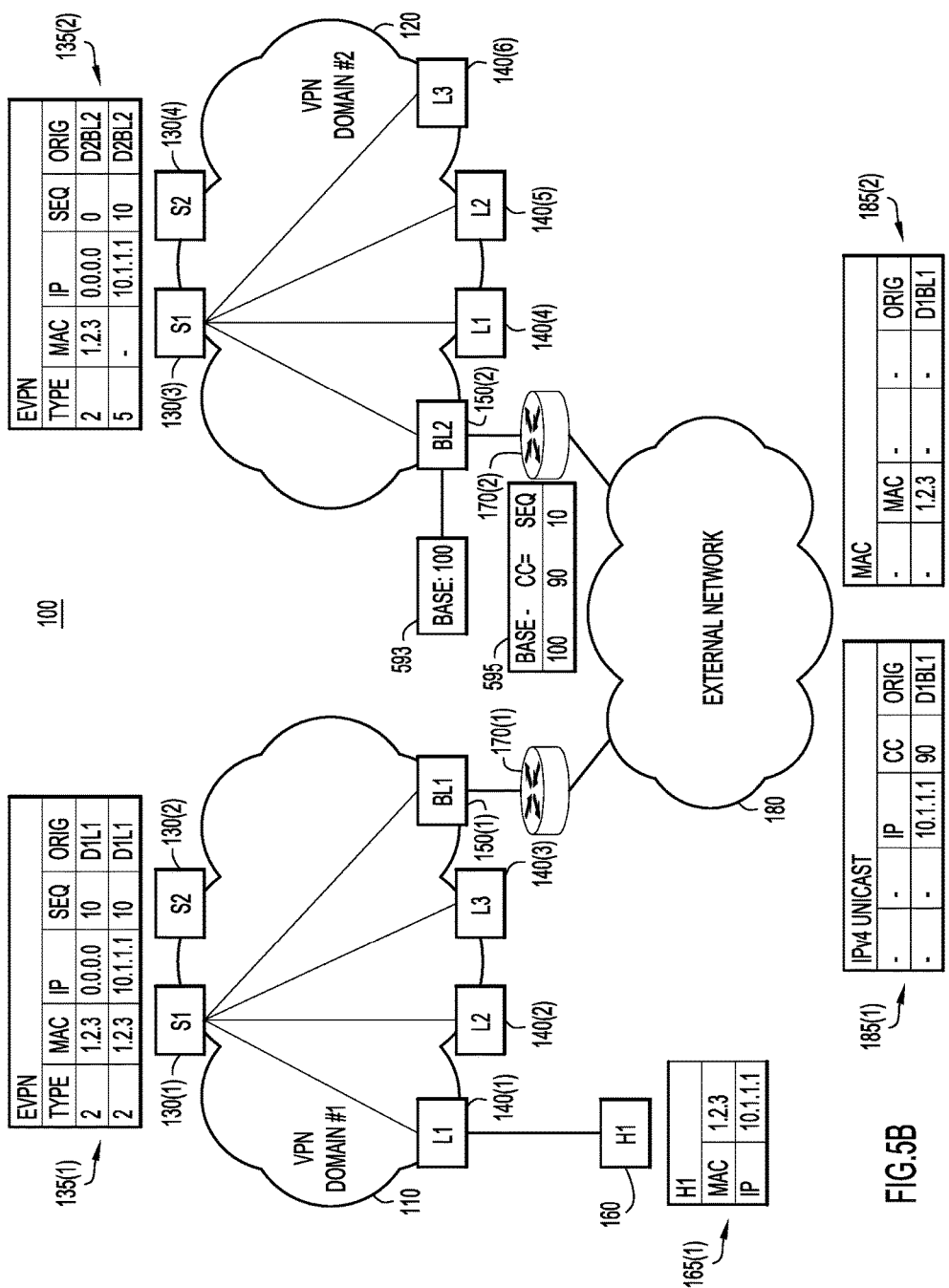

In summary, FIGS. 5A and 5B illustrate a technique by which the sequence number of a Layer 3 route is carried between a first domain 110 and a second domain 120 to prevent duplicate hosts from sharing the same IP address and facilitating the routing of Layer 3 packets to the host device 160 associated with the IP address. As illustrated above, the border leaf node 150(1) encodes the sequence number included in the Layer 3 route associated with the host device for the first domain 110 into a cost community attribute, which is carried across the Layer 3 fabric of the external network 180, and is received by the border leaf node 150(2), which creates a Layer 3 route including the sequence number and advertises the Layer 3 route in the second domain 120.

Figure 6:
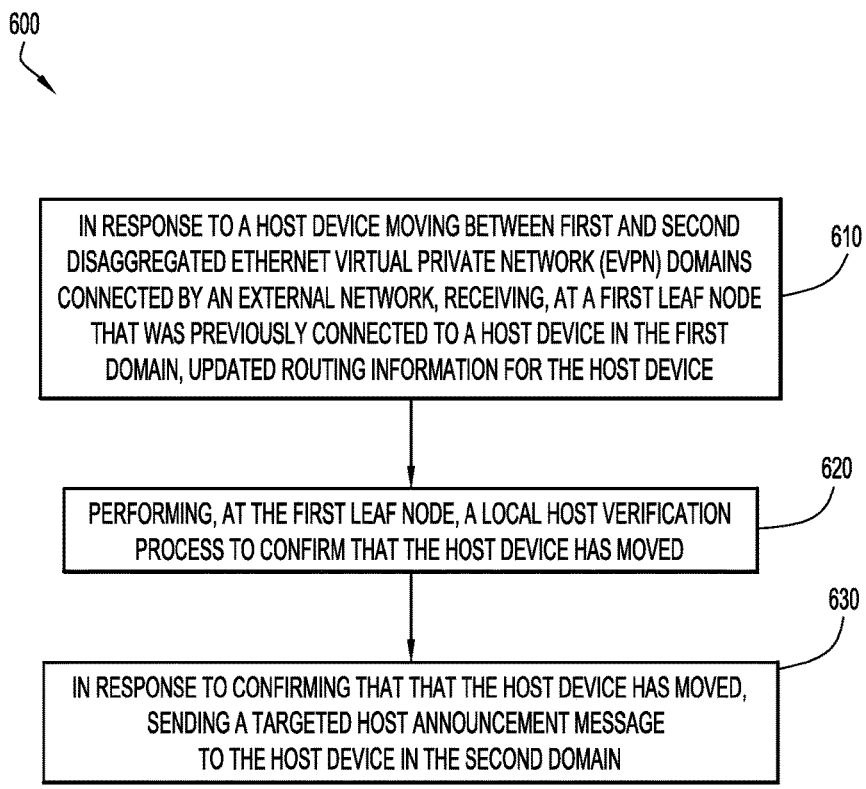
FIG. 6 is a flowchart of operations performed by a leaf node to update routing information in response to movement of a host device between disaggregated EVPN domains, according to an example embodiment.

FIG. 6 is a flowchart illustrating a method 600 performed by a leaf node in accordance with examples presented herein. Method 600 begins at 610 where, in response to a host device moving between first and second disaggregated EVPN domains connected by an external network, a first leaf node that was previously connected to a host device in the first domain, receives updated routing information for the host device. At 620, the first leaf node performs a local host verification process to confirm that the host device has moved. At 630, in response to confirming that that the host device has moved, the first leaf node sends a targeted host announcement message (e.g., a targeted address resolution protocol (ARP) message, a targeted neighbor discovery protocol (NDP) message, etc.) to the host device in the second domain.

Figure 7:
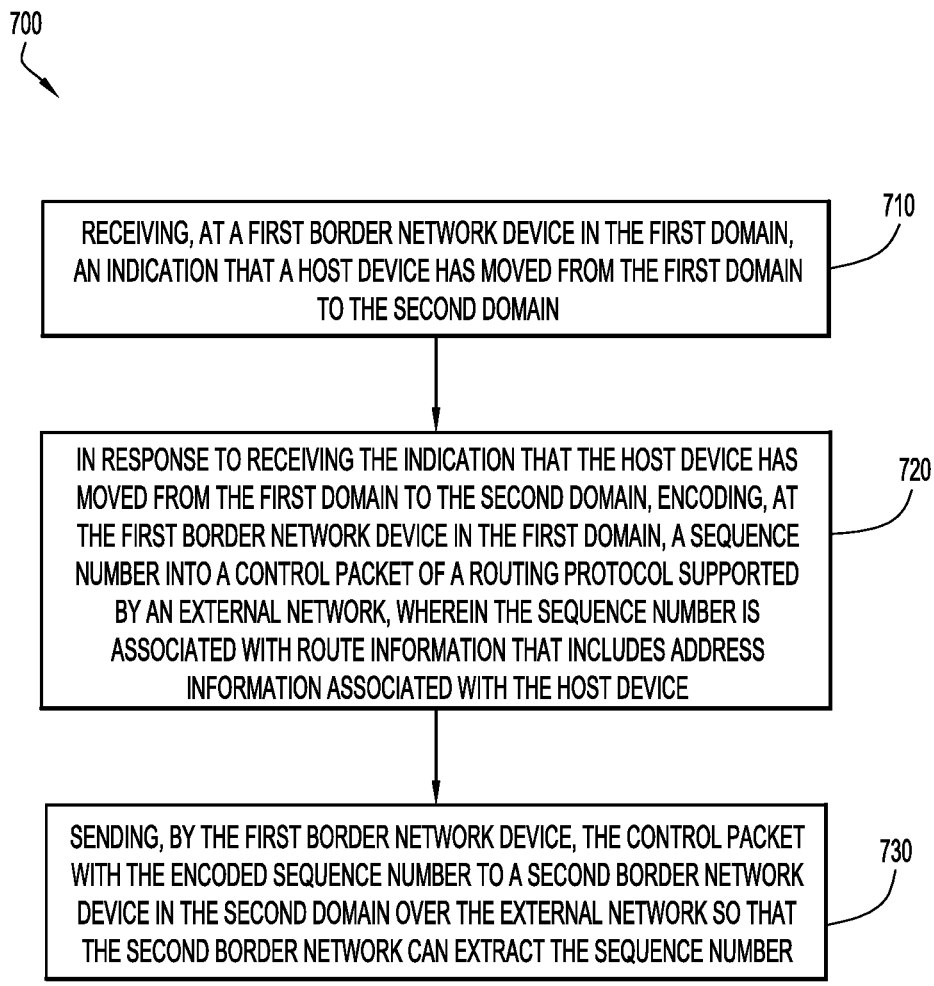
FIG. 7 is a flowchart of operations performed by a border leaf node to carry a sequence number associated with a host device upon movement between disaggregated EVPN domains, according to an example embodiment.

FIG. 7 is a flowchart illustrating a method 700 performed by a border leaf node in accordance with examples presented herein to carry a sequence number associated with a physical or virtual host device (host) across an external network. Method 700 begins at 710 where a first border network device in a first domain EVPN domain receives an indication that a host device has moved from the first domain to a second domain. At 720, in response to receiving the indication that the host device has moved from the first domain to the second domain, the first border network device, encodes a sequence number associated with the host device into a control packet routed by a routing protocol supported by the external network, wherein the sequence number is associated with routing information that includes address information associated with the host device. At 730, the first border network device sends the control packet with the encoded sequence number to a second border network device in the second domain over the external network so that the second network device can extract the encoded sequence number.

Figure 8:
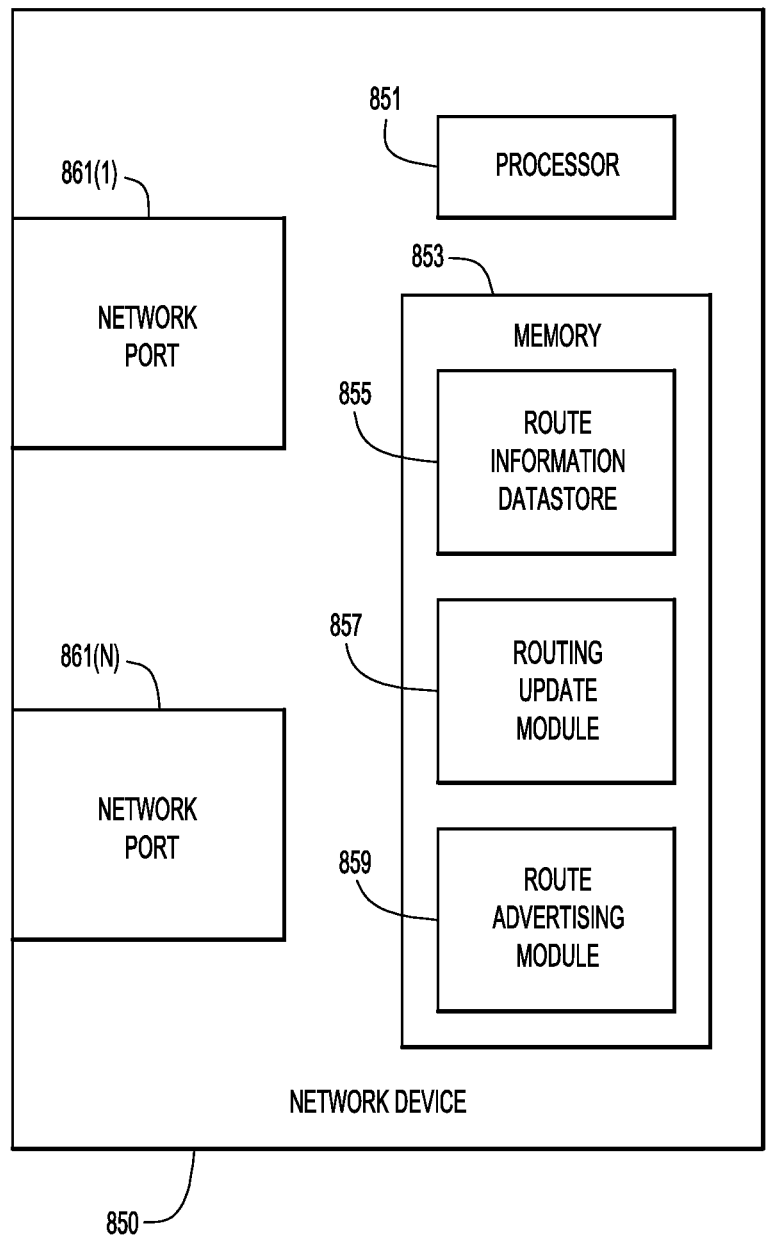
FIG. 8 is a block diagram of a leaf node, according to an example embodiment.

FIG. 8 a block diagram illustrating a leaf node 850 that is configured to execute examples presented herein. It should be understood that leaf node 850 may be either leaf node 140(N) or border leaf node 150(N). The leaf node 850 includes one or more processors 851, a memory 853, which stores routing information data store 855, routing update module 957, and a route advertising module 859. The leaf node 850 also comprises a plurality of network interface ports 861(1)-861(N). Processor 851 may be a microprocessor or microcontroller. Memory 853 may include read only memory (ROM), random access memory (RAM), magnetic disk storage media devices, optical storage media devices, flash memory devices, electrical, optical, or other physical/tangible memory storage devices. Processor 851 executes instructions stored in memory 853 to implement the techniques presented herein. The memory 853 includes routing information data store 855, which stores Layer 2 and Layer 3 routes associated with one or more host devices.

In general, memory 853 may include one or more tangible (non-transitory) computer readable storage media (e.g., a memory device) encoded with software comprising computer executable instructions and, when the software is executed (by processor 851), it is operable to perform the operations described herein in connection with the techniques described herein to seamlessly move a host device from a first domain to a second domain in a disaggregated EVPN.

Advantages of the examples include facilitating the distribution and movement of across tenant hosts in an enterprise network comprising multiple EVPN domains, providing for better utilization of server resources, disaster recovery and increasing the scale of the enterprise network. Sequence numbers associated with the tenant hosts play a vital role in facilitating host mobility and help the system to move a host from a first domain to a second domain. By ensuring consistent and accurate L2 and L3 routing information, the examples disclosed herein provide for optimal forwarding of L2 and L3 traffic to tenant end hosts that have moved to a new location. Furthermore, the disclosed examples prevent duplicate host IDs, allowing the system to seamlessly distribute and move tenant hosts from one EVPN domain to another, while ensuring accurate routing information associated with the tenant host devices.

It is to be appreciated that the above examples are not mutually exclusive and may be combined in various arrangements. It is also to be appreciated that the above description is intended by way of example only. Various modifications and structural changes may be made therein without departing from the scope of the concepts described herein and within the scope and range of equivalents of the claims.

What is claimed is:

1. A method comprising:
    at a leaf node in a first Ethernet virtual private network (EVPN) domain connected to a second EVPN domain via an external network, each EVPN domain configured to perform traffic routing for hosts based on routing information including sequence numbers that are incremented when hosts move to indicate most up-to-date routing information, wherein the external network is not configured to directly carry the sequence numbers between the first EVPN domain and the second EVPN domain:
    by the leaf node, in response to a host moving from the first EVPN domain to the second EVPN domain, receiving for the host updated routing information including an updated sequence number that is larger than a sequence number previously associated with the host when previously located in the first EVPN domain; and
    by the leaf node, in response to the receiving, upon determining that the host has moved:
        sending to the host in the second EVPN domain a targeted host announcement message configured to enable the second EVPN domain to establish routing information for the host in the second EVPN domain;
        converting, using a subtraction operation, the updated sequence number to a converted sequence number able to be carried by the external network; and
        sending the converted sequence number over the external network to a border leaf node of the second EVPN domain so that the border leaf node is able to extract and use the updated sequence number for traffic routing with respect to the host in order to avoid use of inconsistent and stale routing information in the second EVPN domain.

2. The method of claim 1, wherein the updated routing information for the host further comprises updated Layer 2/3 routing information for the host.

3. The method of claim 2 wherein:
    the determining that the host has moved includes:
        determining that the host was previously attached to the leaf node;
        in response to determining that the host was previously attached to the leaf node, sending a host verification message to a local port via which the host was previously attached to the leaf node, wherein the host verification message includes a timeout period for receipt of a response; and
        determining that a response to the host verification message to has not been received within the timeout period; and
    the method further comprises, in response to determining that no response to the host verification message has been received within the timeout period, deleting the Layer 2/3 routing information previously associated with the host.

4. The method of claim 1, wherein the targeted host announcement message sent from the leaf node in the first EVPN domain to the host in the second EVPN domain includes a destination media access control (MAC) address of the host and a source MAC address corresponding to an anycast gateway MAC address for all leaf nodes of the first EVPN domain.

5. The method of claim 1, wherein in response to receiving the targeted host announcement message, the host sends a unicast response that includes a destination media access control (MAC) address of an anycast gateway MAC address for all leaf nodes of the first EVPN, domain, and wherein the method further comprises:
    trapping the unicast response at a second leaf node in the second EVPN domain to which the host is connected.

6. The method of claim 1, wherein sending the targeted host announcement message to the host in the second EVPN domain comprises:
    sending a targeted Address Resolution Protocol (ARP) message to the host in the second EVPN domain.

7. The method of claim 1, wherein sending the targeted host announcement message to the host in the second EVPN domain comprises:
    sending a targeted Neighbor Discovery Protocol (NDP) message.

8. The method of claim 1, wherein the converting includes converting the sequence number to a cost community attribute that is supported by the IP-Border Gate Protocol.

9. The method of claim 8, wherein the converting further includes subtracting the sequence number from a base number that is a maximum value permitted for the cost community attribute.

10. An apparatus comprising:
    a plurality of network interface ports configured to enable network communications; and a processor, coupled to the plurality of network interface ports, and configured to:
in response to a host moving from a first Ethernet virtual private network (EVPN) domain to a second EVPN domain connected to the first EVPN domain by an external network, each EVPN domain configured to perform traffic routing for host devices based on routing information including sequence numbers that are incremented when hosts move to indicate most up-to-date routing information, wherein the external network is not configured to directly carry the sequence numbers between the first EVPN domain and the second EVPN domain, receive for the host device updated routing information including an updated sequence number that is larger than a sequence number previously associated with the host device when previously located in the first EVPN domain; and
in response to the receiving for the host the updated routing information, upon determining that the host device has moved:
send to the host device in the second EVPN domain a targeted host announcement message configured to enable the second EVPN domain to establish routing information for the host device in the second EVPN domain;
convert, using a subtraction operation, the updated sequence number to a converted sequence number able to be carried by the external network; and
send the converted sequence number over the external network to a border leaf node of the second domain so that the border leaf node is able to extract and use the updated sequence number for traffic routing with respect to the host device in order to avoid use of inconsistent and stale routing information in the second EVPN domain.

11. The apparatus of claim 10, wherein the updated routing information for the host further comprises updated Layer 2/3 routing information for the host.

12. The apparatus of claim 11, wherein:
the processor is configured to perform the determining by:
determining that the host was previously attached to the leaf node;
in response to determining that the host was previously attached to the leaf node, sending a host verification message to a local port via which the host was previously attached to the leaf node, wherein the host verification message includes a timeout period for receipt of a response; and
determining that a response to the host verification message to has not been received within the timeout period; and
the processor is further configured to, in response to determining that no response to the host verification message has been received within the timeout period, delete Layer 2/3 routing information previously associated with the host.

13. The apparatus of claim 10, wherein the targeted host announcement message sent from the apparatus in the first EVPN domain to the host in the second EVPN domain includes a destination media access control (MAC) address of the host and a source MAC address corresponding to an anycast gateway MAC address for all leaf nodes of the first EVPN domain.

14. The apparatus of claim 10, wherein to send a targeted host announcement message to the host in the second EVPN domain, the processor is configured to send a targeted Address Resolution Protocol (ARP) message to the host in the second EVPN domain.

15. One or more non-transitory computer readable storage media encoded with instructions that, when executed by a processor of a leaf node in a first Ethernet virtual private network (EVPN) domain connected to a second EVPN domain via an external network, each EVPN domain configured to perform traffic routing for hosts based on routing information including sequence numbers that are incremented when hosts move to indicate most up-to-date routing information, wherein the external network is not configured to directly carry the sequence numbers between the first EVPN domain and the second EVPN domain, cause the processor to:
in response to a host moving from the first EVPN domain to the second EVPN domain, receive for the host updated routing information including an updated sequence number that is larger than a sequence number previously associated with the host when previously located in the first EVPN domain; and
in response to receiving for the host the updated routing information, upon determining that the host has moved:
send to the host in the second EVPN domain a targeted host announcement message configured to enable the second EVPN domain to establish routing information for the host in the second EVPN domain;
convert, using a subtraction operation, the updated sequence number to a converted sequence number able to be carried by the external network; and
send the converted sequence number over the external network to a border leaf node of the second domain so that the border leaf node is able to extract and use the updated sequence number for traffic routing with respect to the host in order to avoid use of inconsistent and stale routing information in the second EVPN domain.

16. The non-transitory computer readable storage media of claim 15, wherein the updated routing information for the host further comprises updated Layer 2/3 routing information for the host.

17. The non-transitory computer readable storage media of claim 15, wherein the instructions operable to perform the determining that the host has moved include instructions operable to:
determine that the host was previously attached to the leaf node;
in response to determining that the host was previously attached to the leaf node, send a host verification message to a local port via which the host was previously attached to the leaf node, wherein the host verification message includes a timeout period for receipt of a response; and
determine that a response to the host verification message to has not been received within the timeout period; and
further comprising instructions operable to, in response to determining that no response to the host verification message has been received within the timeout period, delete, at the leaf node, Layer 2/3 routing information previously associated with the host while attached to the first leaf node.

18. The non-transitory computer readable storage media of claim 15, wherein the targeted host announcement message sent from the leaf node in the first EVPN domain to the host in the second EVPN domain includes a destination media access control (MAC) address of the host and a source MAC address corresponding to an anycast gateway MAC address for all leaf nodes of the first EVPN domain.

19. The non-transitory computer readable storage media of claim 15, wherein the instructions operable to send a host verification message to a local port via which the host was attached to the leaf node comprise instructions operable to:
    send an Address Resolution Protocol (ARP) refresh to the local port to which the host was attached, wherein the ARP refresh includes a timeout period for receipt of an ARP response.

20. The non-transitory computer readable storage media of claim 15, wherein the instructions operable to send the targeted host announcement message to the host in the second EVPN domain comprise instructions operable to:
    send a targeted Address Resolution Protocol (ARP) message to the host in the second EVPN domain.

* * * * *